April 23, 1963     H. A. LEFLET, JR     3,086,377
APPARATUS FOR BENDING GLASS SHEETS
Filed May 13, 1957     2 Sheets-Sheet 1
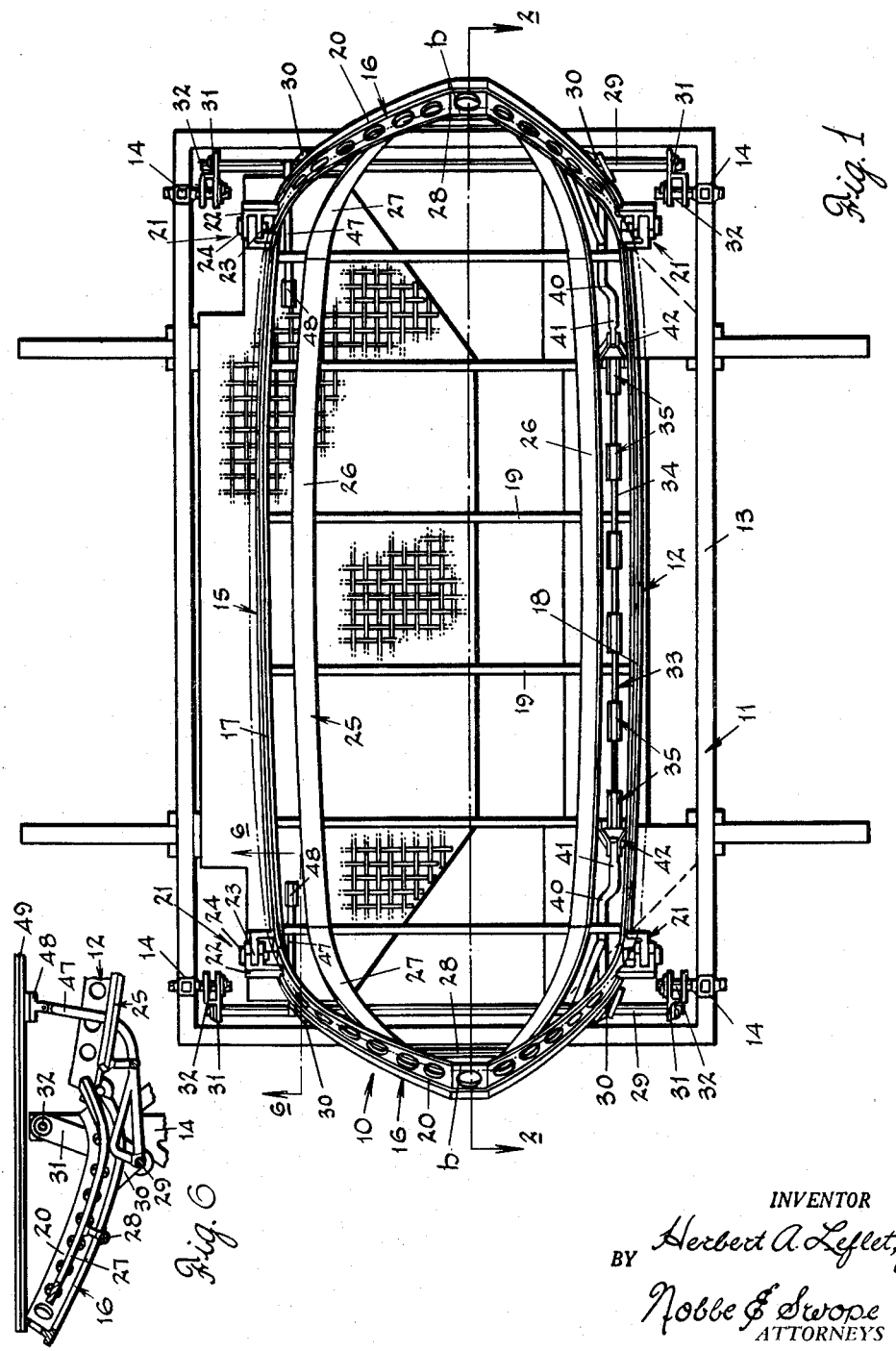
INVENTOR
BY *Herbert A. Leflet, Jr.*
*Nobbe & Swope*
ATTORNEYS April 23, 1963 H. A. LEFLET, JR 3,086,377
APPARATUS FOR BENDING GLASS SHEETS
Filed May 13, 1957 2 Sheets-Sheet 2
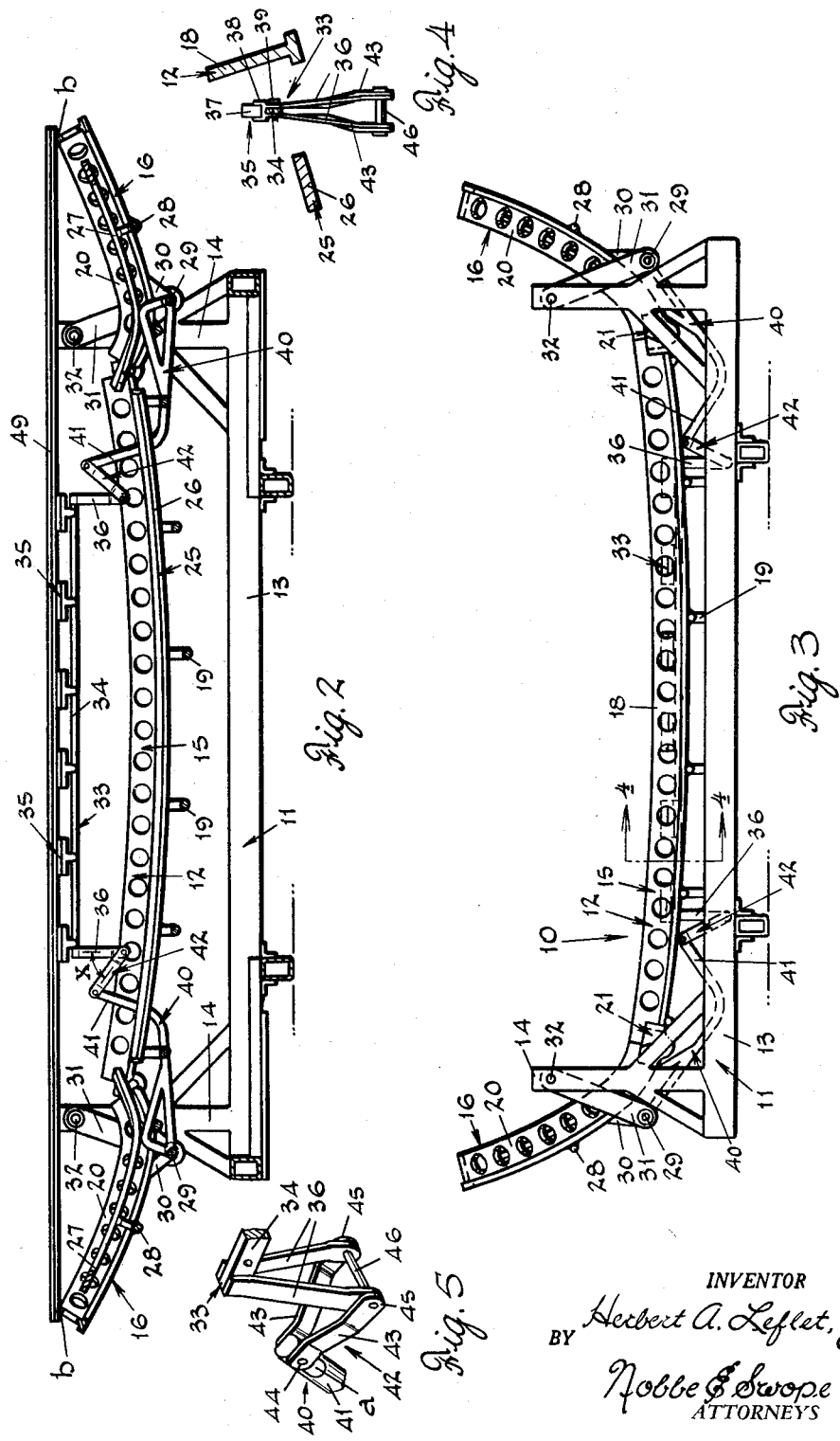
INVENTOR
Herbert A. Leflet, Jr.
BY
Nobbe & Swope
ATTORNEYS United States Patent Office 3,086,377
Patented Apr. 23, 1963

3,086,377
APPARATUS FOR BENDING GLASS SHEETS
Herbert A. Leflet, Jr., Toledo, Ohio, assignor to Libbey-Owens-Ford Glass Company, Toledo, Ohio, a corporation of Ohio
Filed May 13, 1957, Ser. No. 658,585
2 Claims. (Cl. 65—290)

The present invention relates generally to apparatus for bending glass sheets or plates, and more particularly to a bending mold having improved glass sheet support means.

In the bending of glass sheets, particularly relatively long sheets, upon bending molds of the multiple section type wherein one or more mold sections are movable, it is oftentimes desirable to support the glass sheet intermediate the ends thereof prior to the sheet being bent into contact with the mold shaping surface. The multiple section bending molds commonly used for forming symmetrical bends comprises a center section and oppositely disposed movable end sections which move from a spread apart position in the open mold position prior to bending a glass sheet to a closed position during the bending of the sheet. In the open position, the glass sheet is usually supported upon the outermost extremities of the mold and not supporting intermediate its ends. However, when the sheet is of abnormal length it is very desirable to support the sheet intermediate its ends so that excessive sheet deflection will not take place. Also, the intermediate sheet support tends to stabilize the sheet as it bends into contact with the mold center section and this is also true with respect to sheets of normal length which are also oftentimes bent upon multiple section molds having intermediate supports associated therewith.

It will be readily understood by those familiar with the art that when intermediate support means are provided with a bending mold it is important that the support means move in a manner such that the sheet is gradually and evenly lowered as it moves toward the shaping surface of the mold.

It is therefore an important object of the present invention to provide a multiple section bending mold having improved movable support means for engaging a glass sheet intermediate the ends thereof prior to and during bending of said sheet.

Another object of the invention is to provide such a mold with intermediate sheet support means that are freely movable and do not bind.

A further object of the invention is to provide such a mold with intermediate support means that will not move longitudinally relative to the glass sheet.

Other objects and advantages of the invention will become more apparent during the course of the following description when taken in connection with the accompanying drawings.

In the drawings, wherein like numerals are employed to designate like parts throughout the same:

FIG. 1 is a plan view of a bending mold constructed in accordance with the present invention;

FIG. 2 is a longitudinal sectional view taken along the line 2—2 of FIG. 1 and showing the mold in the open position;

FIG. 3 is a side elevation of the mold shown in FIG. 1 while in the closed position;

FIG. 4 is a fragmentary sectional view taken along the line 4—4 of FIG. 3;

FIG. 5 is an enlarged fragmentary view of a portion of the improved sheet support means; and FIG. 6 is a fragmentary elevation view taken along the line 6—6 of FIG. 1.

With reference now to the drawings and particularly to FIGS. 1 and 2 thereof, there is shown a bending apparatus 10 constructed in accordance with the invention. The apparatus 10 comprises a support frame or rack 11 and a bending mold 12 carried by said rack. The rack 11 is of conventional construction and comprises a substantially rectangular framework 13 provided adjacent each of the four corners thereof with a vertical member 14.

The bending mold 12 includes a center section 15 and a pair of end sections 16. The mold center section comprises a pair of spaced, concavely curved shaping rails 17 and 18 connected to one another by means of cross bars 19.

Each of the mold end sections 16 comprises a substantially triangular, concavely curved shaping rail 20 having its innermost ends aligned with the adjacent ends of the center section rails 17 and 18 and movably connected thereto by means of hinges 21 commonly used in bending molds of this type and which comprise yoke members 22 secured to the rails 20 and interfitting members 23 secured to the ends of the rails 17 and 18. Axially aligned holes are provided in the members 22 and 23 to receive a hinge pin 24.

Carried within the confines of the mold shaping rails is a strain bar 25 comprising spaced center portions 26 carried by the rods 19, and triangular end portions 27 carried by rods 28 secured to the triangular rails 20.

To support the mold sections for movement from the open position of FIG. 2 to the closed position of FIG. 3, a transverse rod 29 is rigidly secured to each of the mold end sections by means of depending struts 30 and has its opposite ends extending outwardly therefrom to be rotatably received in the lowermost ends of aligned links 31 swingably mounted at their uppermost ends upon pins 32 rigidly secured to the uprights 14.

In accordance with the invention, the bending mold 12 is provided adjacent the rail 18 and spaced inwardly therefrom with improved intermediate sheet support means generally designated by the numeral 33. As best shown in FIGS. 2 and 4, the support means 33 comprises a longitudinally extending bar 34 having a plurality of sheet engaging members 35 supported thereon and having a pair of depending members 36 rigidly secured to the outermost ends thereof. Each of the sheet engaging members 35 comprises a sheet support block 37, preferably formed of "Marinite" (registered trademark), carried by a support base 38 mounted upon the bar 34, for pivotal movement in a vertical plane, by means of a pin 39.

To support the rod 34 for movement in a substantially vertical plane, an arm 40 is carried by each of the mold end sections 16 and rigidly secured to each of the transverse rods 29 and has an inwardly and upwardly extending shank portion 41 which terminates beneath and outwardly of the bar 34, in alignment therewith, and somewhat above and adjacent to the lower ends of the depending members 36. As shown in FIG. 5, the end of the shank portion is ground flat on opposed sides thereof to form substantially parallel surfaces $a$.

The arms 40 are connected to the depending members 36 by linkage means 42 comprising a pair of bar members 43 secured lightly against and straddling the arm portion 41 and pivotally connected thereto by a pin 44. Inwardly of the pin 44, each of the bar members 43 is bent outwardly and then inwardly to form substantially parallel end portions 45 which straddle the lowermost ends of the depending members 36 and are pivotally secured thereto by means of a pin 46.

For preferred operating conditions, it is very desirable that equal distance and angular relationship be maintained between the component members of the improved support means 33. More specifically, each of the arms 40 should preferably be of substantially equal length as measured on a straight line between the support rods 30 and the pivot pins 44. The linkage 42 at each end of the bar 34 should also be of equal length as measured from the pin 44 to the pin 46, and the depending members 36 at each end of the bar 34 should also be of equal length as measured from the pin 46 to the upper surface of the bar 34. With these various distances being maintained substantially equal, the angle $x$ between the linkage 42 and the depending members 36 will, of course, be maintained substantially constant. By holding the dimensions between the connecting points of the various members to the aforementioned limitations, the vertical movement of the support blocks 37 should be accomplished with the sheet engaging surfaces of these blocks being maintained substantially horizontal throughout the entire movement of the bar 34 from the open mold position of FIG. 2 to the closed position of FIG. 3.

To support the longitudinal marginal area of the sheet opposite that which is supported by the improved support means 33, auxiliary support arms 47 are carried by each of the mold end sections which arms, as best shown in FIG. 6, are rigidly secured to the rods 29 and extend inwardly and upwardly therefrom. At their uppermost ends, the arms 47 have a sheet engaging member 48 attached thereto which is substantially identical to the member 35 and supported on the arms 47 in substantially the same manner.

In bending a glass sheet upon the improved apparatus of the present invention, the mold sections are first swung about the support rods 29 to the open position of FIG. 2 wherein it will be noted that the upper surface of each of the sheet engaging members 35 and 48 and the upper extremities $b$ of the end section shaping rails 20 lie in a common, substantially horizontal plane. A glass sheet 49, or pair of sheets, to be bent is then supported upon the mold with the outermost ends of the sheet being supported by the outer ends of the triangular rail sections 20 and the intermediate portion of the sheet along the marginal edges thereof by the members 35 and 48. The bending apparatus with the glass sheet supported thereon is then passed into and through a bending furnace wherein the sheet is gradually heated to bending temperature and until it begins to soften. As the sheet softens, the mold end sections are no longer held in the open mold position due to the glass sheet losing its rigidity and, due to the weight of the mold center section, the mold end sections have their outermost ends $b$ in engagement with the glass sheet rotated upwardly and inwardly about the transverse rods 29. At the same time, the arms 40 and 47, due to their rigid attachment to the transverse rods 29, are rotated downwardly with the arms 40 lowering the bar member 34 therewith. During the downward movement of the arms 40, the angle $x$ between the linkage 42 and the depending members 36 gradually and evenly decreases due to the relatively small amount of frictional movement between the respective members 36, 42 and 41 as a result of the pinned connections therebetween and there is little if any tendency for the bar 34 to move toward either end section of the mold. Since the arm portion 41 is also aligned with the bar 34, there is no tendency for the blocks 37 to be inclined transversely and thus the sheet 49 being bent is supported in a relatively stable manner during the lowering thereof toward the mold center section. In the final movement of the mold sections, the arms 40 and 47 lower the sheet engaging members 35 and 48 beneath the upper surface of the center section rails 17 and 18 thus depositing the glass sheet in contact therewith.

It will be readily appreciated by those familiar with the art of bending glass that apparatus constructed in accordance with the present invention provides a relatively simple and yet smooth operating mechanism for bending a glass sheet and that although it is desirable to maintain equal lengths etc., of the component members of the support means 33, some variation from the optimum may be tolerated.

It is to be understood that the form of the invention herewith shown and described is to be taken as a preferred embodiment of the same, and that various changes may be resorted to without departing from the spirit of the invention or the scope of the subjoined claims.

I claim:

1. A bending mold for bending glass sheets, comprising a pair of movable mold sections, sheet support means comprising an elongated member having a pair of spaced legs extending downwardly therefrom, an arm operably connected to each of said movable mold sections and extending above the lowermost ends of said legs, and links between and swingably connected to said arms and said legs.

2. A bending mold for bending glass sheets as defined in claim 1, wherein sheet engaging members are carried by the elongated member and extend upwardly therefrom.

References Cited in the file of this patent

UNITED STATES PATENTS

| 2,857,713 | Cleminson | Oct. 28, 1958 |
| 2,872,756 | Jendrisak | Feb. 10, 1959 |

FOREIGN PATENTS

| 1,097,088 | France | Feb. 9, 1955 |
| 1,124,919 | France | July 9, 1956 |
| 1,128,601 | France | Oct. 27, 1956 |
| 200,861 | Australia | Feb. 2, 1956 |
| 201,078 | Australia | Feb. 22, 1956 |
| 745,992 | Great Britain | Mar. 7, 1956 |
| 764,448 | Great Britain | Dec. 28, 1956 |
| 768,485 | Great Britain | Feb. 20, 1957 |